Patented Apr. 4, 1939

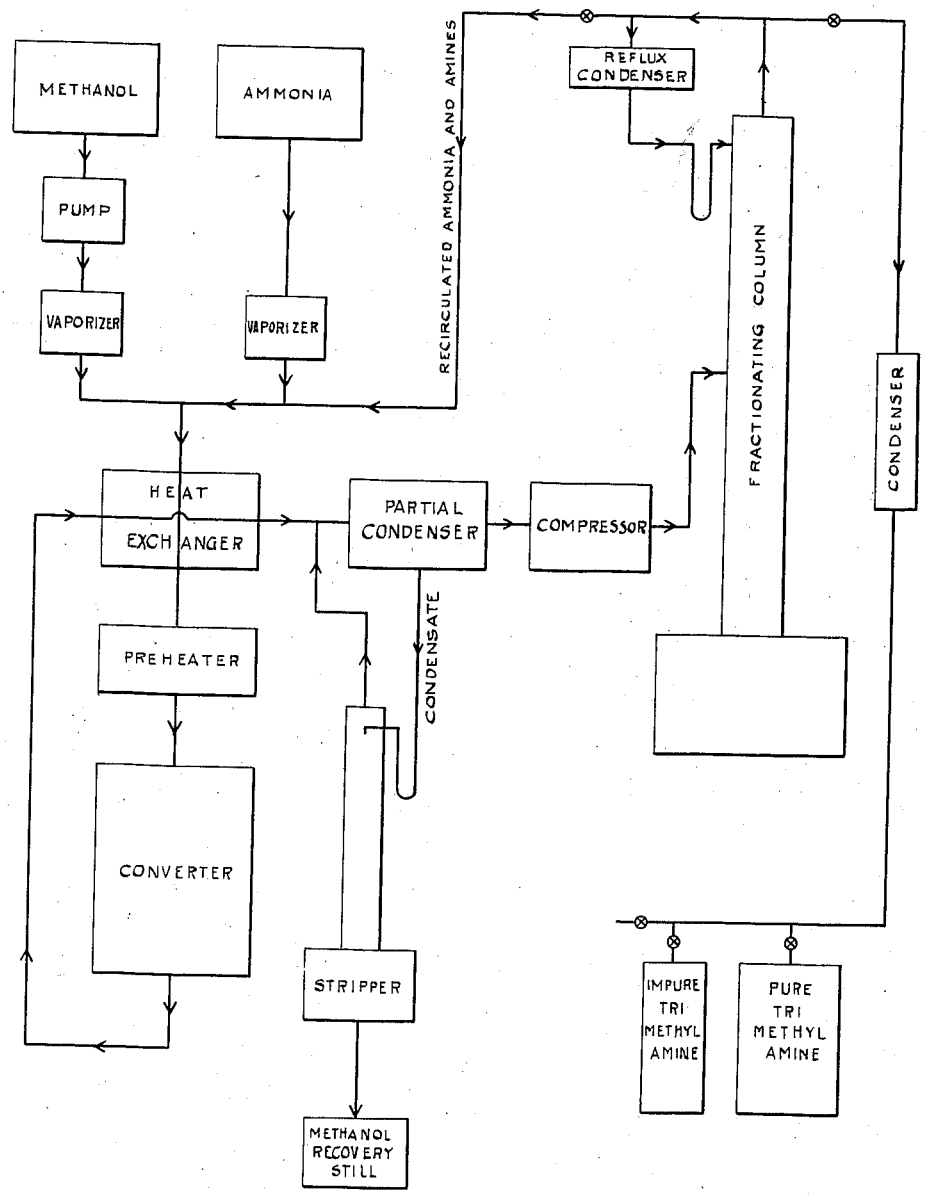

2,153,405

UNITED STATES PATENT OFFICE 2,153,405

MANUFACTURE OF TRIMETHYLAMINE

Chester E. Andrews, Overbrook, and Le Roy U. Spence, Cheltenham, Pa., assignors to Röhm & Haas Company, Philadelphia, Pa.

Application May 21, 1936, Serial No. 80,952

8 Claims. (Cl. 260—585)

This invention relates to the production of trimethylamine by the reaction of methanol with ammonia, monomethylamine, or dimethylamine, or mixtures of these substances.

In the manufacture of methylamines by the reaction of methanol and ammonia, the product obtained is a mixture of monomethylamine, dimethylamine and trimethylamine. The production of trimethylamine can be favored by using a high ratio of methanol to ammonia and by operating under temperatures higher than are desirable for the production of monomethylamine and dimethylamine, but even under the most favorable conditions some monomethylamine and dimethylamine will be formed. Furthermore, using high ratios of methanol to ammonia makes necessary the recovery of large quantities of methanol if the operation is to be economical.

The separation of trimethylamine from mixtures such as are obtained by the reaction of methanol with ammonia is very difficult. If the product is distilled ammonia comes off first, carrying with it appreciable quantities of trimethylamine with which it forms a constant boiling mixture. The next fraction, which is high in monomethylamine, also contains a considerable proportion of trimethylamine due to the formation of another constant boiling mixture. If the distillation is conducted at atmospheric pressure, trimethylamine comes off next but since its boiling point is only 4° C. lower than that of dimethylamine, an efficient separation of the two by ordinary distilling methods is impractical and requires repeated distillations or the use of a fractionating column of high efficiency.

The object of our invention is to provide an improved process for the manufacture of trimethylamine of high purity.

In our copending application, Serial No. 75,122 filed April 18, 1936, which has matured into Patent No. 2,126,600, August 9, 1938, we have shown that the composition of a constant boiling monomethylamine-trimethylamine mixture depends upon the pressure under which it is distilled. If the distillation is carried out at atmospheric pressure, the mixture obtained contains about 30% by weight of trimethylamine. As the distilling pressure is increased, the trimethylamine concentration in the distillate decreases until at 60 pounds gauge it is about 15%, and at 210 pounds gauge about 7%.

We have now found that if a mixture of dimethylamine and trimethylamine is distilled under high pressure, dimethylamine is the major component of the distillate. Although trimethylamine is more volatile than dimethylamine at atmospheric pressure, their boiling points approach each other as the pressure is increased until at about 60 pounds gauge they boil at the same temperature. On further increase in pressure the dimethylamine becomes more volatile than trimethylamine. The following table shows how the boiling points change at increasing pressure:

| Pressure, lbs. gauge | Boiling points | |
|---|---|---|
| | Di | Tri |
| | °C. | °C. |
| 0 | 7.2 | 3.5 |
| 30 | 37 | 35 |
| 60 | 54 | 54 |
| 100 | 70 | 72 |
| 150 | 84 | 88 |
| 200 | 95 | 100 |
| 300 | 115 | 122 |

In our present invention we utilize our above discoveries in an efficient and economical process for producing trimethylamine. Essentially our process consists in passing a mixture of methanol and ammonia over a dehydrating catalyst, condensing out water of reaction and unreacted methanol, compressing the mixture of ammonia and amines, distilling off the ammonia, monomethylamine and dimethylamine under a pressure in excess of 60 pounds gauge, and continuously circulating the distillate with added methanol over the dehydrating catalyst until the product obtained is substantially pure trimethylamine. The step of distilling under high pressure accomplishes two purposes; first, it makes the dimethylamine more volatile than the trimethylamine, whereby it passes over as distillate, and second, it substantially reduces the quantity of trimethylamine in the constant boiling mixture it forms with monomethylamine.

The accompanying flow sheet illustrates graphically and in detail the various steps of our complete process as we prefer to use it. The following description is made with reference thereto. As is shown, methanol vapor and ammonia gas are mixed, heated to reaction temperature by being passed through a suitable heat exchanger and preheater, and then passed into a converter where they come in contact with a dehydrating catalyst and react to form methylamines and water. The gases leaving the converter are passed through the heat exchanger and then to a cooler where unreacted methanol and the water of reaction are condensed out and separated. A stripping column is provided to recover ammonia and amines from the condenser liquid, the ammonia and amines being returned to the cooler and the stripped liquid passing to a methanol recovery still.

The gases leaving the partial condenser are compressed and passed into a fractionating column equipped with a suitable reflux condenser. This column is operated under a pressure in excess of 60 pounds gauge, preferably under pressure of the order of 20 pounds gauge. At the beginning of the operation the constant boiling trimethylamine-ammonia mixture is the most volatile material in the still and will collect at the top of the column. Monomethylamine and dimethylamine with some trimethylamine remain in the still pot. The mixture passing from the top of the column is added to the methanol and ammonia being supplied to the converter and the system is operated in the manner described until charged with sufficient ammonia to produce the desired amount of trimethylamine. Thereafter the supply of ammonia gas is shut off and the mixture coming from the top of the column is circulated with added methanol through the system until the ammonia and amines have practically all been converted to trimethylamine. This point can be readily observed by watching the density of the liquid recovered from the stripper. While the circulated gases contain appreciable amounts of ammonia, monomethylamine and dimethylamine, the added methanol reacts to produce water. When the circulating gases become low in these substances, very little methanol reacts. The stripper liquid thereupon becomes high in methanol and correspondingly low in density. The point at which the operation is discontinued is largely a matter of choice, depending upon the required purity of trimethylamine. If a product containing 85% or 90% by weight of trimethylamine is satisfactory, it may be stopped while considerable methanol is still reacting. The process can conveniently be continued, however, until the material in the still pot contains 97 to 98% trimethylamine. For higher purity a separate distillation as hereinafter described is preferred.

At the beginning of the operation the gas coming from the top of the fractionating column consists primarily of ammonia together with such trimethylamine as is carried over as a constant boiling mixture with ammonia. As the operation continues the composition of the gas progressively changes. After all the ammonia has been converted to methylamines, the constant boiling monomethylamine-trimethylamine mixture becomes the most volatile material in the still and forms the major component in the distillate passing therefrom. At this stage of the operation dimethylamine and trimethylamine remain in the still pot. On further reaction all the monomethylamine is converted to dimethylamine and trimethylamine, whereupon because of the high distilling pressure, dimethylamine forms the major component in the distillate. Because of the difficulty in separating dimethylamine and trimethylamine by fractionation, a considerable quantity of trimethylamine is carried over with the dimethylamine. The change that takes place in the composition of the circulating materials is not a sharp change, demarcating the point at which all ammonia is converted to amines or all monomethylamine converted to dimethylamine, but rather is a gradual transition from ammonia as the major component at the beginning of the operation through monomethylamine and dimethylamine to substantially pure trimethylamine at the end of the operation. Throughout the entire operation however, the gas passing from the top of the column contains to some extent all four of the materials in the still.

When the reaction is carried to the stage where only a small part of methanol is reacting, it is best to stop the operation of the converter and distill off the material left in the still, separating it into one fraction which contains the small amount of unreacted ammonia, monomethylamine and dimethylamine, and a second fraction consisting of pure trimethylamine. The fraction containing the ammonia, monomethylamine and dimethylamine will also contain substantial quantities of trimethylamine and can be used for charging the next run. This distillation can be effected either in the same or a different fractionating column. The system illustrated in the flow sheet contemplates using the same fractionating column, but where it is undesirable to have the converter idle during this distillation a separate column may be used. In this way the operation can be carried out as a semi-continuous process. In doing so the contents of the fractionating column are removed to a separate still when the density of the stripper liquid indicates that only small amounts of methanol are reacting. At the same time the ammonia supply is reopened.

The process can be conducted as a fully continuous process by using two fractionating columns in the system—one to remove ammonia and monomethylamine, and the second to separate dimethylamine from trimethylamine, the distillates from both being mixed and returned to the converter. Such operation is not recommended however, because of the difficulty in effecting a good separation of dimethylamine from trimethylamine. A fully continuous process may also be carried out by using in series alternately arranged, a sufficient number of converters and high pressure fractionating columns to effect substantially complete methylation of the ammonia, monomethylamine and dimethylamine.

By the batch process above described trimethylamine of 99-100% purity may be obtained. The yield, based on the ammonia, is 90% of theory, or better, depending upon the losses of ammonia and amines through leaks. After recovery of the methanol from the stripper liquid, and from the still pot any that is not removed by the stripper, the yield, based on methanol, is practically theoretical.

The distillation can be carried out at any pressure above 60 pounds. The range between 100 and 300 pounds gauge is found very satisfactory and we prefer to operate at a pressure of 200 pounds gauge.

The catalyst used may be any dehydrating catalyst capable of causing reaction between methanol and ammonia, monomethylamine or dimethylamine. The catalysts described in copending application, Serial No. 527,352 filed April 2, 1931, which has matured into Patent No. 2,073,671, March 16, 1937, are preferred.

It is desirable to operate the converter under some pressure above atmospheric. When chiefly ammonia is being circulated, a pressure of 50-75 pounds is preferred and when chiefly amines are circulated, a pressure of 30-50 pounds is preferred. These are the highest pressures that can be safely used without the ammonia and amines condensing in the piping at room temperature and causing trouble in the compressor. The advantages derived from using pressure in the converter system are that better separation of methanol and water can be effected in the partial condenser, and a compressor of smaller capacity can be used.

In carrying out our process it is not necessary to use a high ratio of methanol. In the early stages of the process the ammonia and amines circulating may well be in excess of the methanol, so that nearly all the methanol is converted to amines. There will then be no need of recovery of methanol from the stripper liquid during this part of the operation. Near the end of the process the methanol input should be based on the amount of ammonia, monomethylamine and dimethylamine in the circulated gas. The proportion of 1 to 2 mols of methanol per mol equivalent of ammonia, monomethylamine and dimethylamine will be sufficient to complete the process in a short time. The temperature in the converter is preferably within the range of from 300 C. to 350 C. This range is most favorable to the production of trimethylamine. Temperatures above 500° C. tend to decompose the trimethylamine formed and at temperatures below 250° C. very little reaction occurs.

Although the process has been described with reference to the production of trimethylamine from methanol and ammonia as the starting materials, it is apparent that monomethylamine or dimethylamine can be used in place of ammonia and that a mixture of any two or all three can be used. It is also apparent that instead of supplying ammonia to the system in the manner above described, the operation may be started by first completely charging the system with the amount of ammonia necessary to produce the desired quantity of trimethylamine. Other modifications that do not depart from the spirit of the invention will be apparent to those skilled in the art.

We claim:

1. A process for the preparation of trimethylamine which comprises passing a mixture of methanol and ammonia at a temperature between 300° C. and 350° C. over a dehydrating catalyst, condensing from the product methanol and water, compressing the resulting mixture of ammonia and amines, fractionally distilling said mixture under a gauge pressure of approximately 200 pounds, retaining the residue in the still pot while continuously circulating the distillate with added methanol and ammonia over the dehydrating catalyst and back into the fractionating column until the system is charged with sufficient ammonia to produce the desired amount of trimethylamine, thereafter continuing the circulation of distillate with added methanol only until the material in the still contains at least 85% trimethylamine and then separating the reaction product by distilling at a pressure above 60 pounds gauge into one fraction containing trimethylamine and any unreacted ammonia, monomethylamine, and dimethylamine and a second fraction consisting of substantially pure trimethylamine.

2. A process for the preparation of trimethylamine which comprises passing a mixture of methanol and ammonia at a temperature between 250° and 500° C. over a dehydrating catalyst, condensing from the product methanol and water, compressing the resulting mixture of ammonia and amines, fractionally distilling said mixture under a gauge pressure of from 100 to 300 pounds, retaining the residue in the still pot while continuously circulating the distillate with added methanol and ammonia over the dehydrating catalyst and back into the fractionating column until the system is charged with sufficient ammonia to produce the desired amount of trimethylamine, thereafter continuing the circulation of distillate with added methanol only until the material in the still contains at least 85% trimethylamine and then separating the reaction product by distilling at a pressure above 60 pounds gauge into one fraction containing trimethylamine and any unreacted ammonia, monomethylamine, and dimethylamine and a second fraction consisting of substantially pure trimethylamine.

3. A process for the preparation of trimethylamine which comprises passing a mixture of methanol and ammonia at a temperature between 250° and 500° C. over a dehydrating catalyst, condensing from the product methanol and water, compressing the resulting mixture of ammonia and amines, fractionally distilling said mixture under a gauge pressure above 60 pounds, retaining the residue in the still pot while continuously circulating the distillate with added methanol and ammonia over the dehydrating catalyst and back into the fractionating column until the system is charged with sufficient ammonia to produce the desired amount of trimethylamine, and thereafter continuing the circulation of distillate with added methanol until the material in the still pot contains at least 85% trimethylamine.

4. A process for the preparation of trimethylamine which comprises reacting a member of the group consisting of ammonia, monomethylamine nad dimethylamine with methanol in the presence of a dehydrating catalyst, fractionating the amines obtained under a gauge pressure of from 100 to 300 pounds, retaining the residue in the still while circulating the distillate with added methanol only over the dehydrating catalyst and back into the fractionating column until the material in the still contains at least 85% trimethylamine and then separating the reaction product into one fraction containing any unreacted ammonia, monomethylamine and dimethylamine and a second fraction consisting of substantially pure trimethylamine.

5. A process for the preparation of trimethylamine which comprises reacting a member of the group consisting of ammonia, monomethylamine and dimethylamine with methanol in the presence of a dehydrating catalyst, fractionating the amines obtained under a gauge pressure of from 100 to 300 pounds and while retaining the residue in the still pot, circulating the distillate with added methanol only over the dehydrating catalyst and back into the fractionating column until the material in the still contains at least 85% trimethylamine.

6. A process for the preparation of trimethylamine which comprises reacting a member of the group consisting of ammonia, monomethylamine and dimethylamine with methanol in the presence of a dehydrating catalyst, fractionating the amines obtained under a gauge pressure above 60 pounds and while retaining the residue in the still pot, circulating the distillate with added methanol only over the dehydrating catalyst and back into the fractionating column until the material in the still contains at least 85% trimethylamine.

7. In a process for the preparation of trimethylamine the steps of passing a member of the group consisting of ammonia, monomethylamine, dimethylamine, mixtures thereof with one another and with trimethylamine through a fractionating column operating under a gauge pressure above 60 pounds and while retaining the residue in the still pot, circulating the distillate with added methanol only through a methylamine converter, a condenser for separating methanol and water, and back into the fractionating column.

8. In a process for the preparation of trimethylamine the steps of passing a member of the group consisting of ammonia, monomethylamine, dimethylamine, mixtures thereof with one another and with trimethylamine through a fractionating column operating under a gauge pressure of from 100 to 300 pounds and while retaining the residue in the still pot, circulating the distillate with added methanol only through a methylamine converter, a condenser for separating methanol and water, and back into the fractionating column.

CHESTER E. ANDREWS.
LE ROY U. SPENCE.

CERTIFICATE OF CORRECTION.

Patent No. 2,153,405. April 4, 1939.

CHESTER E. ANDREWS, ET AL.

It is hereby certified that error appears in the printed specification of the above numbered patent requiring correction as follows: Page 2, first column, line 11, for the numeral "20" read 200; page 3, second column, line 37, claim 4, for "nad" read and; and that the said Letters Patent should be read with this correction therein that the same may conform to the record of the case in the Patent Office.

Signed and sealed this 6th day of June, A. D. 1939.

Henry Van Arsdale (Seal) Acting Commissioner of Patents.